Figure 1:
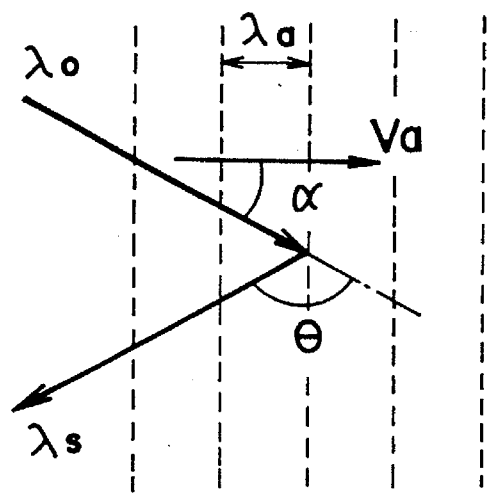

US005515193A

United States Patent [19]
Sorel et al.

[11] Patent Number: 5,515,193
[45] Date of Patent: May 7, 1996

[54] OPTICAL COMMUNICATIONS SYSTEM USING TRAVELLING WAVE SEMICONDUCTOR OPTICAL AMPLIFIERS

[75] Inventors: Yvon Sorel; Jean-Claude Simon, both of Louannec; René Auffret, Perros Guirec, all of France

[73] Assignee: France Telecom Etablissement autonome de droit public, Paris, France

[21] Appl. No.: 936,283

[22] Filed: Aug. 28, 1992

[30] Foreign Application Priority Data

Aug. 30, 1991 [FR] France .................................. 91 10773

[51] Int. Cl.$^6$ .................................................. H04B 10/00
[52] U.S. Cl. .......................... 359/125; 359/133; 359/175
[58] Field of Search ..................................... 359/126, 125, 359/137, 135, 136, 139, 133, 254, 266, 179, 344, 345, 175, 174; 385/1–3

[56] References Cited

U.S. PATENT DOCUMENTS

| 4,333,178 | 6/1982 | Farrington | 354/179 |
|---|---|---|---|
| 4,642,804 | 2/1987 | Personick | 359/126 |
| 4,918,396 | 4/1990 | Halemane et al. . | |
| 5,063,567 | 11/1991 | Nakajima . | |
| 5,099,350 | 3/1992 | Hisao . | |
| 5,227,907 | 7/1993 | Rao et al. | 359/126 |
| 5,264,960 | 11/1993 | Glance | 359/344 |

FOREIGN PATENT DOCUMENTS

| 0414333 | 2/1991 | European Pat. Off. . |
| 0440276 | 8/1991 | European Pat. Off. . |
| 2546012 | 11/1984 | France . |
| 3732626 | 4/1989 | Germany . |

OTHER PUBLICATIONS

"Cascaded Carrier Depletion Optical Switches Based On InP/GaInAsP Waveguides"; (ECOC '90); pp.213–216; J. A. Cavailles et al.
"Synchronization Of Passive Access Nodes In Very High Speed Optical Packet Networks"; (ECOC '90); pp. 473–476; T. M. Martinson.
"InP Monolithically Integrated Passive Access Node Switches For Very High Speed Optical Loop"; (ECOC '90); pp. 1015–1018; M. Erman et al.
"Traveling Wave Semiconductor Laser Amplifier Detectors"; Journal of Lightwave Technology, vol. 8, No. 4, Apr. 1990; pp. 610–617; Mats Gustavsson et al.
"Single Mode Polarization Insensitive GaInAsP/InP Total Internal Reflection Optical Switch"; (ECOC '90); pp. 217–220; M. Renaud et al.

*Primary Examiner*—Benedict V. Safourek
*Assistant Examiner*—Ajit Patel
*Attorney, Agent, or Firm*—Oblon, Spivak, McClelland, Maier & Neustadt

[57] ABSTRACT

Optical communications system using traveling wave semiconductor optical amplifiers has at lest one optical fiber (2), tranceivers, (S1. . . , SN) placed along the fiber and having in each case at least one travelling wave semiconductor optical amplifier (A1. . . , AN), which is located in series with the fiber and transmission means (L1, L2) for feeding into the fiber at least one continuous optical signal. Each amplifier is used alternately to modulate the continuous optical signal in order to transmit information, and to detect information modulations of the optical signal which carry information.

13 Claims, 3 Drawing Sheets

OPTICAL COMMUNICATIONS SYSTEM USING TRAVELLING WAVE SEMICONDUCTOR OPTICAL AMPLIFIERS

BACKGROUND OF THE INVENTION

Field of the Invention

The present invention relates to an optical communications system. It applies to optical telecommunications and in particular to the production of optical buses.

Description of the Background

An optical network is already known to which the connection of a speaker requires not only a receiver and a transmitter, but also two optical couplers, which respectively serve to sample information transmitted by the optical line of said optical network to bring same to the receiver and inject into said optical line information from the transmitter.

This known optical network suffers from the disadvantage that the losses caused by the couplers limit the number of speakers and consequently the size of the network.

In addition, the following documents disclose:

(1) Cascaded carrier depletion optical switches based on InP/GaInAsP waveguides, J.A. Cavalilles et al, Reports of ECOC'90, pp. 213–216, (2) Single mode polarization insensitive GaInAsP/InP total internal reflection optical switch, M. Renaud et al, Reports of ECOC'90, pp. 217–220, (3) Synchronization of passive access nodes in very high speed optical packet networks, T.M. Martison, Reports of ECOC'90, pp. 473–476, (4) InP monolithically integrated passive access node switches for very high speed optical loop, M. Erman et al., Reports of ECOC'90, pp. 1015–1018, communications networks along which are placed passive access nodes having optical switches. The latter inter alia suffer from the disadvantage of extracting from said communications networks a relatively high lighting power when used as detectors.

SUMMARY OF THE INVENTION

The object of the invention is to obviate the aforementioned disadvantages.

For this purpose the invention uses travelling wave semiconductor optical amplifiers, each of which alternately ensures an information detection function and an information transmission function by the modulation of a continuous optical signal.

More specifically, the present invention relates to an optical communications system, characterized in that it comprises at least one optical fiber and transmission-reception stations positioned along said optical fiber, each station having at least one travelling wave semiconductor optical amplifier located on the optical fiber and in that the system also comprises transmission means for feeding into said optical fiber at least one continuous optical signal which thus traverses the amplifier of each station and in that the amplifier is provided in order to alternately modulate, with the aid of modulating means, the continuous optical signal traversing said amplifier, in order to transmit information to at least one of the other amplifiers, which receive the thus modulated signal and detecting, with the aid of detecting means, information in the form of at least one modulated signal intended for said amplifier and which was transmitted by another amplifier of the system and transmitted by the optical fiber.

Therefore, in the present invention, a single component fulfills both transmission and reception functions.

According to the invention, the number of components of an optical bus is significantly reduced and the losses associated with optical couplers are no longer encountered.

The invention makes it possible to obtain a larger size and higher dynamics optical network than the known optical networks, due to the gain of the amplifiers used in the invention.

It is known from (5) Travelling wave semiconductor Laser amplifier detectors, Mats Gustavsson et al., Journal of Lightwave Technology, vol. 8, no. 4, Apr. 1990, pp. 610–617, to use a traveling wave optical amplifier also known as a non-resonant optical amplifier as a detector, particularly on an optical fiber data bus. However, this (5) does not provide for the adaptation of the amplifier in such a way that it functions alternately as a detector and as a modulator.

According to a special embodiment of the system according to the invention, at least one of the amplifiers has a first electrode and a second electrode, which are respectively connected to the modulating means and to the detecting means.

According to another special embodiment, at least one of the amplifiers has an electrode which is alternately connected to the modulating means and to the detecting means.

The transmission means can comprise a first laser and a second laser, which are respectively placed at the two ends of the optical fiber each of said first and second lasers feeding into the said optical fiber a continuous optical signal.

Preferably, the respective transmission wavelengths of the first and second lasers are different and each laser is provided with a filter preventing it from receiving the light from the other laser, so as not to disturb the operation of the lasers.

Finally, each station can comprise first and second travelling wave semiconductor optical amplifiers connected in parallel on the optical fiber, each of said first and second amplifiers being provided to alternately modulate the continuous optical signal transmitted by one of the lasers and detect information resulting from the modulation of said signal by at least one other amplifier of the system and on the other have a filter preventing it from receiving the light from the other laser.

The invention is described in greater detail hereinafter relative to non-limitative embodiments and with reference to the attached drawings, in which:

FIG. 1 A diagrammatic view of a special embodiment of the system according to the invention.

Figure 2:
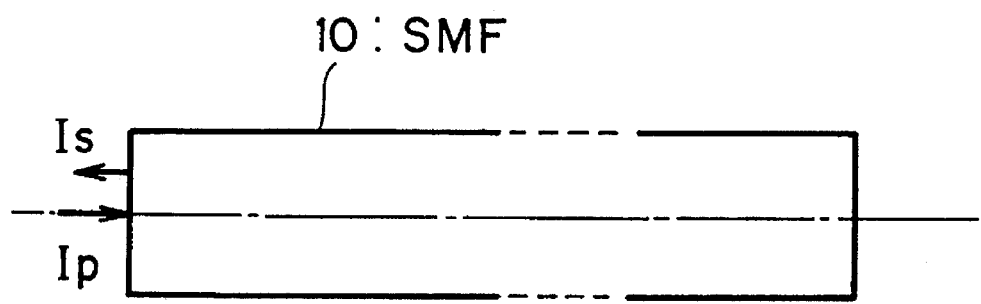
Figure 2:
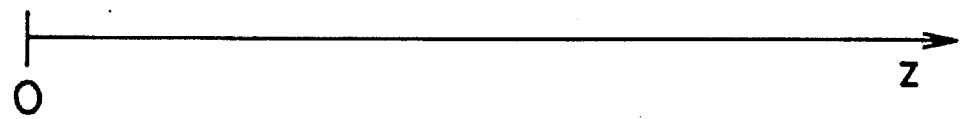
Figure 2:
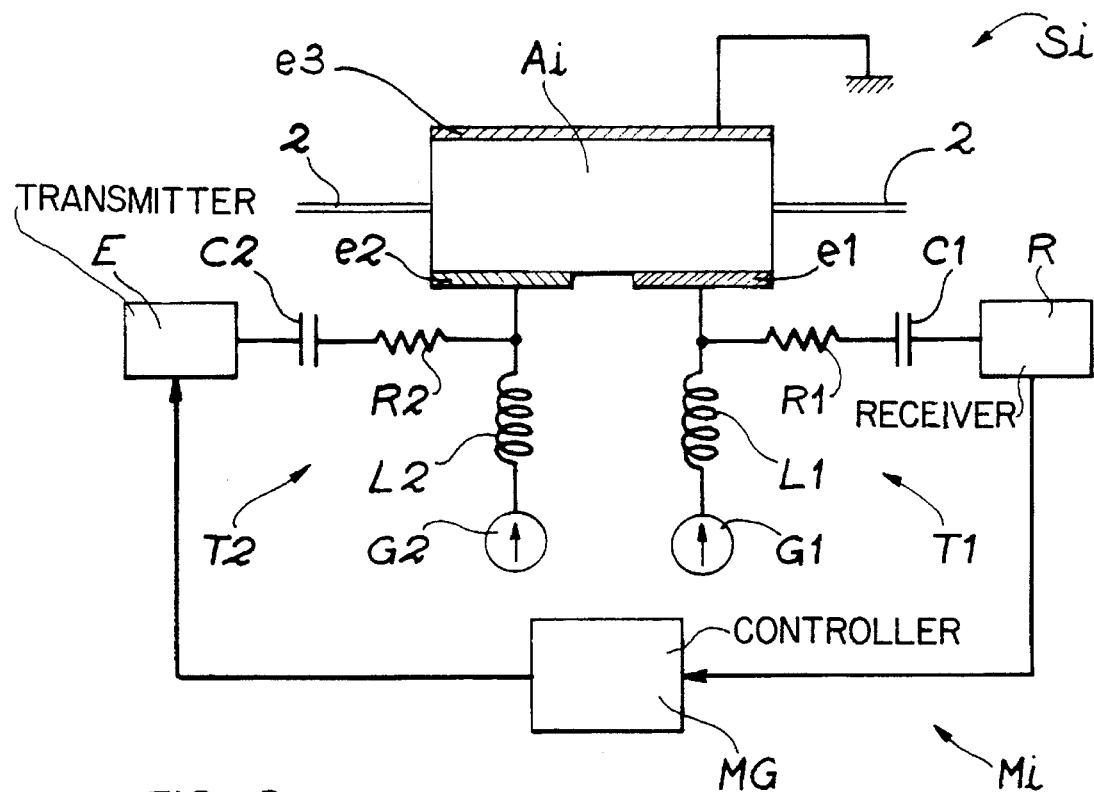

FIG. 2 A diagrammatic view of a travelling wave semiconductor optical amplifier having two working electrodes usable in the present invention.

Figure 3:
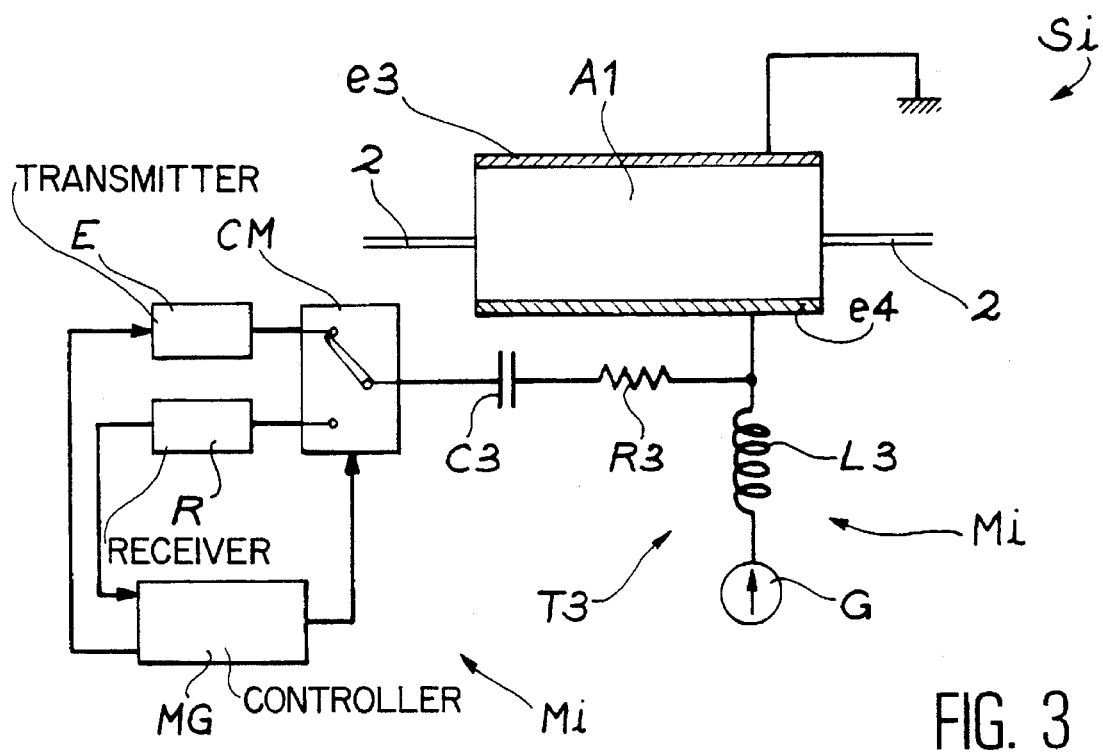

FIG. 3 A diagrammatic view of a travelling wave semiconductor optical amplifier having a single working electrode and which can also be used in the present invention.

Figure 4:
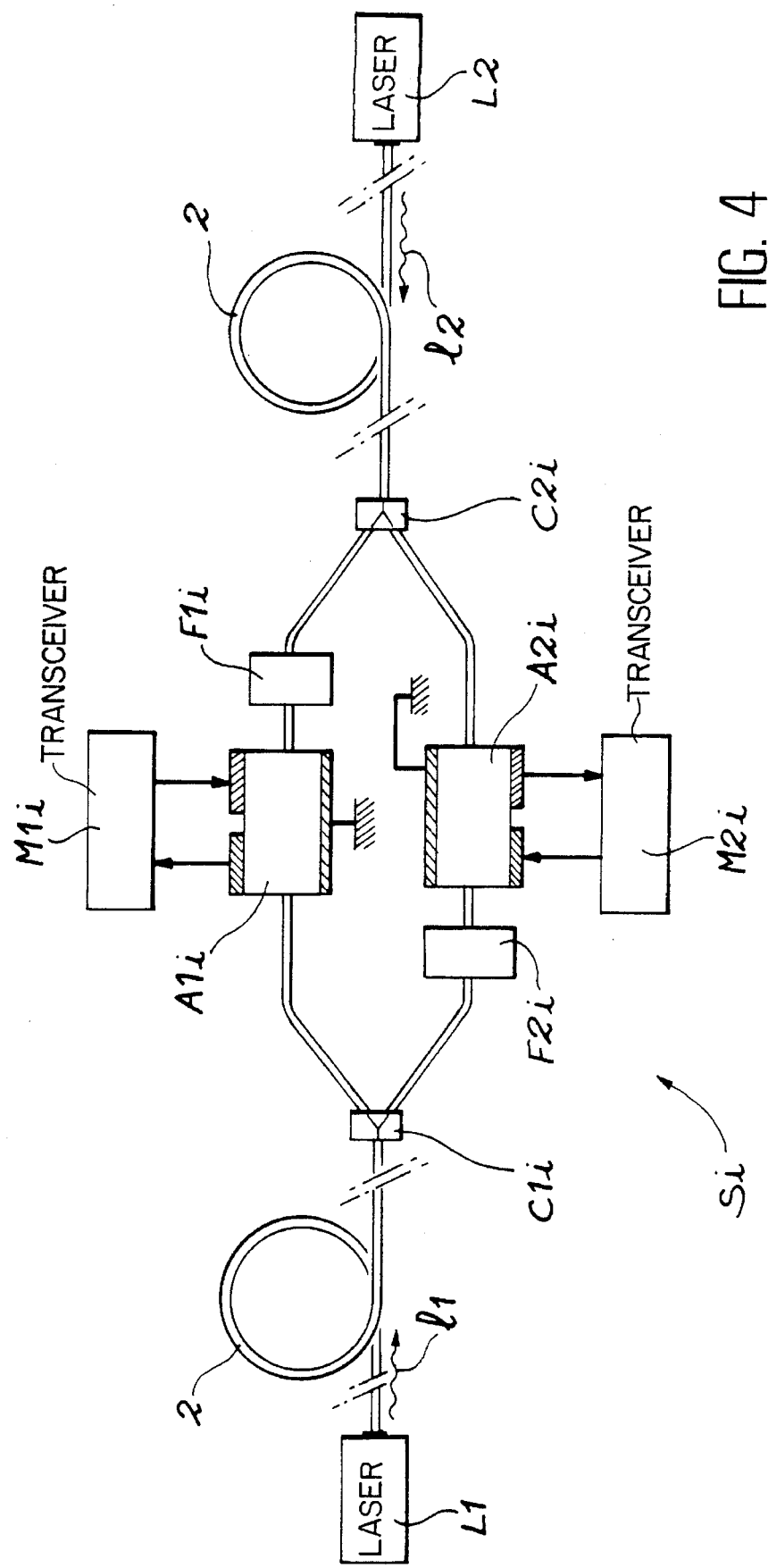

FIG. 4 a diagrammatic, partial view of another special embodiment of the system according to the invention.

FIG 1 diagrammatically shows a system according to the invention in the form of an optical bus having an open loop structure. This optical bus comprises an optical transmission line e.g. constituted by a single-mode fiber 2. Along said fiber 2 are placed N transmission-reception stations S1, S2, ..., SN-1, Sn, in which N is an integer at least equal to 2.

These N stations S1, S2, ..., SN-1, SN respectively have N travelling wave semiconductor optical amplifiers A1, A2, ..., AN-1, AN.

These optical amplifiers are installed on the optical fiber 2 and are interconnected by sections of said optical fiber, in such a way that they are successively traversed by light injected at one end of the optical fiber 2.

Moreover, two lasers L1, L2 are respectively placed at the two ends of the optical fiber 2. The laser L1 feeds into the said fiber 2 by means of a lens that is not shown lens a continuous optical signal of wavelength L1. In the same way the laser L2 feeds into the optical fiber 2 by means of another lens that is not shown a continuous optical signal of wavelength 2. Thus, the fiber 2 is traversed by continuous optical signals in accordance with two opposite transmission directions.

The wavelengths L1 and L2 can be equal, but preferably are different and then:

between the laser L1 and the corresponding end of the fiber 2 is provided a filter F1, which eliminates the light of wavelength L2 propagated in the fiber in the direction of the laser L1 and, between the laser L2 and the corresponding end of the fiber 2 is a filter 2, which eliminates the light of wavelength L1, which is propagated in the fiber in the direction of the laser L2.

This prevents any disturbance to the operation of the lasers L1 and L2.

Thus, a structure is obtained in which two wavelengths are respectively allocated to the two opposite propagation directions in the fiber 2.

Such a structure is possible because the optical pass band of the travelling wave amplifiers is very large, being equal to or greater than 6000 GHz (which corresponds to more than 50 nm at 1.5 micrometer).

No special problem is caused by the optical filtering of two wavelengths spaced by several dozen nanometers.

Each optical amplifier has an "operating symmetry" in the sense that it functions identically no matter what the light propagation direction.

The two transmission directions authorized by this operating symmetry enable each speaker (i.e. the user of the transmission-reception station) to communicate with speakers located on either side of his station on the optical line.

On returning to FIG. 1, it can be seen that the optical amplifiers A1, A2, ..., AN-1, An are respectively associated with transmission-reception means M1, M2, ..., MN-1, MN, which will be described hereinafter.

In the embodiment shown in FIG. 1, the optical amplifiers are amplifiers having two working electrodes.

FIG. 2 shows one of these amplifiers Ai ($1 \leq i \leq N$) and which is inserted in the optical line 2. The amplifier Ai (i assuming any random one of the values 1 to N) has on one face a first electrode e1 and a second electrode e2 positioned side by side and on the opposite face an earthed or grounded electrode e3. The amplifier Ai is provided with its transmission reception means Mi. The latter comprise a first polarizing tee, carrying the reference T1, a second polarizing tee carrying the reference T2, a transmitter E, a receiver R and electronic control means MG.

The first tee comprises a load resistor R1 (e.g. of 50 ohms) and a blocking inductance L1 and which have a common terminal, the latter being connected to the first electrode e1. The first tee also comprises a shunt capacitor C1 across which the resistor R1 is connected to the input of the receiver R associated with the optical amplifier Ai. The other terminal of the inductance L1 is connected to a first current generator G1, which supplies a polarizing current I1.

The second tee comprises a load resistor R2 (e.g. of 50 ohms) and a blocking inductance L2 and which have a common terminal, the latter being connected to the second electrode e2. The second tee also comprises a shunt capacitor C2 across which the resistor R2 is connected to the output of the transmitter E associated with the optical amplifier Ai. The other terminal of the inductance L2 is connected to a second current generator G2, which supplies a polarizing current I2.

The polarizing currents I1 and I2 are permanently applied.

With regards to detection, when the travelling wave amplifier Ai is traversed by an amplitude-modulated optical signal, it supplies between the electrodes e1 and e3 a voltage, whose variation is liked with that of the number of photons traversing the amplifier Ai. The pass band of this amplifier functioning as a detector is approximately 200 MHz at 3 dB (cf. document (5)).

It is the receiver R which detects and amplifies said voltage and translates it into information intended for the user of the station where the amplifier Ai is located.

With regards to the transmission, when the amplifier Ai is traversed by a continuous optical signal, on modulating the injection current of said amplifier Ai and therefore its gain, said amplifier then behaves like an amplitude modulator, whose 3 dB pass band is approximately 200 MHz, as for detection.

It is the transmitter E which supplies a modulated electric signal translating the information which the user of the corresponding station wishes to supply to one or other stations.

It is therefore possible with a travelling wave optical amplifier having two electrodes to alternately have a transmission function and a reception function, each of the electrodes e1 and e2 being allocated to one of these two functions.

A description will now be given of the operation of the optical bus shown in FIG. 1.

With N speakers on the line, one of the speakers transmits information and the N-1 other speakers receive the transmitted information.

For reception, all the amplifiers A1, ..., AN permanently detect the signals of wavelengths L1 and L2 carried by the fiber 2.

The taking of information is carried out by the addressed station, when its electronic circuits recognize the address preceding any information signal, as is the case for the control protocols of standard optical buses.

For transmission, when a station Si ($1 \leq i \leq N$) transmits, its amplifier Ai amplitude-modulates the continuous optical signals (of wavelengths L1 and L2) which pass through it. This modulation results from an electric signal carrying the information to be transmitted and which comes from the transmitter E of the station Si. The electronic control means MG are connected to the transmitter E and to the receiver R. These control means MG authorize the transmission by the station in question, when another station has finished transmission.

Moreover, said control stations MG produce information authorizing the transmission by any random one of the other stations when the considered station has finished transmitting.

In another special embodiment diagrammatically illustrated by FIG. 3, all or certain of the amplifiers A1, A2, ..., AN have only a single working electrode e4 in place of two working electrodes e1 and e2. In this case, there is only a single polarizing tee designated T3 in FIG. 3.

This tee comprises a load resistor R3 (e.g. equal to 50 ohms) and a blocking inductance L3 and which have a common terminal connected to the electrode e4. The other electrode e3 of the amplifier Ai is grounded as was previously the case. The other terminal of the inductance L3 is connected to a current generator G, which supplies a polarizing current I3.

The other terminal of the resistor R3 is connected to a terminal of a shunt capacitor C3, whose other terminal is connected either to the output of the transmitter E of the considered station Si, or to the input of the receiver R of said station, as a result of a two-position switch CM, whose state or position is controlled by the control means MG of the transmission-reception means Mi of the station.

In this case, when said station has finished transmitting, the switch passes into a reception position (the capacitor C3 then being connected to the receiver R) and when the station receives no information intended for it and said station wishes to transmit, the switch CM passes into the transmission position (the capacitor C3 then being connected to the transmitter E.

In the control protocol account is taken of the propagation time of the signals on the line 2 in order to ensure that information of respective wavelengths L1 and L2 does not simultaneously arrive on one optical amplifier.

In order to simplify the control protocol, it is possible to produce an optical bus according to the invention (not shown) having two parallel optical fibers.

The laser L1 is then placed on one side of the assembly of two fibers and the laser L2 on the other side thereof. The laser L1 supplies the continuous optical signal corresponding thereto to one of the two fibers and the laser L2 supplies the continuous optical fiber corresponding thereto into the other fiber.

Then, each transmission-reception station comprises two travelling wave optical amplifiers respectively installed on the two fibers, each of these two amplifiers obviously being provided with transmission-reception means.

Another special embodiment of the invention diagrammatically and partly shown in FIG. 4 makes it possible to obviate the duplication of equipment envisaged hereinbefore.

In this special embodiment shown in FIG. 4, the lasers L1 and L2 are placed at the two ends of the line 2 and the latter is traversed in opposite directions, as in FIG. 1 by the continuous optical signals of respective wavelengths L2 and L2.

Each station Si ($1 \leq i \leq N$) then comprises two travelling wave semiconductor amplifiers A1i and A2i connected in parallel on the fiber 2.

The station Si also comprises a first optical band-pass filter F1i preventing the arrival of optical signals of wavelengths L2 in the amplifier A1i and a second optical band-pass filter F2i preventing the arrival of optical signals of wavelengths L1 in the amplifier A2i.

For the installation of the station Si on the fiber 2, use is made of a first Y coupler C1i, whereof one branch is connected to the fiber section 2 at which arrive the signals of wavelength L1.

The two other branches of the coupler C1i are respectively connected to one side of the amplifier A1i and to one side of the amplifier A2i, by means of the filter F2i.

Use is also made of a second Y coupler C2i, whereof one branch is connected to the fiber section 2 by which arrive the signals of wavelength L2.

The two other branches of said coupler C2i are respectively connected to the other side of the amplifier A1i by means of the filter F1i and to the other side of the amplifier A2i.

The amplifier A1i of the station Si makes it possible to receive information from any station located between said station Si and the laser L1 and to transmit information in the direction of any station between said station Si and the laser L2.

The amplifier A2i of the station Si makes it possible to transmit information in the direction of any station between said station Si and the laser Li and to receive information from any station between said station Si and the laser L2.

The amplifiers A1i and A2i are obviously respectively associated with transmission-reception means M1i and M2i.

In another, not shown, special embodiment, the optical bus having a closed loop structure and the transmission-reception stations have in each case a single travelling wave semiconductor optical amplifier and are distributed along the optical line of said bus. In this case, a single laser is provided for injecting light into said optical line.

We claim:

1. Optical communication system, characterized in that it comprises:

at least one optical fiber (2);

transmission-reception stations (S1, S1, ..., Si, ... SN0) placed along said at least one optical fiber (2), each of said transmission-reception stations comprising (a) a travelling wave semiconductor optical amplifier (A1, A2, ..., Ai, ..., AN; A1i, A2i) installed on said at least one optical fiber (2), (b) modulation means for modulating a carrier signal, and (c) detection means for detecting a modulation signal;

transmission means, coupled to said at least one optical fiber, (L1, L2) for feeding into said at least one optical fiber, at least one continuous optical signal which thus traverses said travelling wave semiconductor optical amplifier of each of said transmission-reception stations;

control means, coupled to said modulation means and said detection means, for controlling said modulation means; and wherein a first electrode of said travelling wave semiconductor optical amplifier is connected to said modulation means, for providing a first modulation signal, and a second electrode of said travelling wave semiconductor optical amplifier is connected to said detection means, for detecting a second modulation signal (A1, A2, ..., Ai, ..., AN; A1i, A2i), wherein each of said transmission–reception stations transmits information along said at least one optical fiber and each of said transmission-reception stations detects information in the form of at least one modulation signal which has been transmitted by another one of said transmission-reception stations and propagated by said at least one optical fiber (2).

2. System according to claim 1, characterized in that said transmission means comprises a first laser (L1) and a second laser (L2) which are respectively placed at first and second ends of said at least one optical fiber (2), said first and second lasers feeding into said at least one optical fiber of first and second continuous optical signals respectively.

3. System according to claim 2, characterized in that the first (L1) and second (L2) lasers transmit at different wavelengths and in that each of said first and second lasers is provided with a filter (F1, F2) preventing it from receiving the light from the other laser.

4. System according to claim 3, characterized in that each of said transmission-reception stations comprises fist and second travelling wave semiconductor optical amplifiers (A1i, A2i), which are connected in parallel on said at least one optical fiber (2), each of the first and second travelling wave semiconductor optical amplifiers for alternately modulating the continuous optical signal transmitted by one of the first and second lasers and for detecting information resulting from the modulation of the continuous optical signal of said one of the first and second lasers from another one of said transmission-reception stations each of the first and second travelling wave semiconductor optical amplifiers provided with a station filter (F1i, F2i) preventing each of the first and second travelling wave semiconductor optical amplifiers from receiving the light from one of the first and second lasers.

5. An optical communication system, comprising:

an optical fiber;

means, coupled to the optical fiber, for transmitting a light signal along the optical fiber;

a plurality of tranceivers stations, each of the plurality of tranceivers stations comprising
　(a) a travelling wave semiconductor optical amplifier which is connected to the optical fiber so that light travelling along the optical fiber passes through the travelling wave semiconductor optical amplifier,
　(b) a transmitter for generating a transmission signal, and
　(c) a receiver for receiving a detection signal; and control means, coupled to said transmitter and said receiver, for controlling said transmitter;

wherein the travelling wave semiconductor optical amplifier comprises an optically transparent medium and first and second electrodes, the first electrode for electrically coupling the optically transparent medium to the transmitter and the second electrode for electrically coupling the optically transparent medium to the receiver, wherein the first and second electrodes are disposed on the optically transparent medium.

6. An optical communication system according to claim 5, wherein the travelling wave semiconductor optical amplifier is connected in series with the optical fiber.

7. The system according to claim 5, wherein the means for transmitting comprises a first laser and a second laser, the first laser disposed at a first end of the optical fiber for transmitting light along the optical fiber, the second laser disposed at a second end of the optical fiber for transmitting light along the optical fiber.

8. The system according to claim 7, wherein the transmission wavelengths of the first and second lasers are different from one another and each one of the first and second lasers is provided with an optical filter which prevents that laser from receiving the light generated by the other laser.

9. The system according to claim 8, wherein each transceiver station comprises at least two travelling wave semiconductor optical amplifiers which are each connected in parallel to one another and along parallel portions of a branched region that is in series with the optical fiber, each of the at least two travelling wave semiconductor optical amplifiers is coupled to a means for generating a transmission signal for transmission along the optical fiber via the travelling wave semiconductor optical amplifier and a means for receiving a signal that is being transmitted along the optical fiber via the travelling wave semiconductor optical amplifier.

10. An optical communication system, comprising:

an optical fiber;

means, coupled to the optical fiber, for transmitting a light signal along the optical fiber;

a plurality of transceiver stations, each of the plurality of transceiver stations comprising a travelling wave semiconductor optical amplifier which is connected to the optical fiber so that light travelling along the optical fiber passes through the travelling wave semiconductor optical amplifier, wherein the amplifier comprises an electrode means and a transparent region, the electrode means for applying a voltage to and sensing a voltage across the transparent region;

means for generating a modulation signal;

means for receiving a signal from the electrode means;

switch means, coupled to the means for generating, means for receiving, and electrode means, for alternately coupling the electrode means to the means for generating and means for receiving; and control means, coupled to said switch means, said means for generating, and said means for receiving, for controlling said switch means and said means for generating.

11. An optical communication system, comprising:

at least one optical fiber;

a plurality of transmission-reception stations placed along said at least one optical fiber, each of said plurality of transmission-reception stations comprising
　(a) a travelling wave semiconductor optical amplifier installed on said at least one optical fiber,
　(b) modulation means for modulating a carrier signal, and
　(c) detection means for detecting a modulation signal;

transmission means, coupled to said at least one optical fiber, for feeding into said at least one optical fiber, at least one continuous optical signal which thus traverses said optical amplifier of each of said transmission-reception stations;

wherein said optical fiber is connected to said modulation means, for providing a first modulation signal, and to said detection means, for detecting a second modulation signal;

wherein each of said plurality of transmission-reception stations transmits information along said at least one optical fiber and each of said transmission-reception stations detects information in the form of at least one modulation signal which has been transmitted by another one of said transmission-reception stations and propagated by said at least one optical fiber;

wherein said transmission means comprises a first laser and a second laser which are respectively placed at first and second ends of said at least one optical fiber, said first and second lasers feeding into said at least one optical fiber, respectively, first and second continuous optical signals, wherein said optical amplifier comprises an electrode, and further comprising means for alternately connecting said electrode to said modulation means and to said detection means.

12. An optical communication system, comprising:

at least one optical fiber;

a plurality of transmission-reception stations placed along said at least one optical fiber, each of said plurality of transmission-reception stations comprising
  (a) a travelling wave semiconductor optical amplifier installed on said at least one optical fiber,
  (b) modulation means for modulating a carrier signal, and
  (c) detection means for detecting a modulation signal;

transmission means, coupled to said at least one optical fiber, for feeding into said at least one optical fiber, at least one continuous optical signal which thus traverses said optical amplifier of each of said transmission-reception stations;

wherein said optical fiber is connected to said modulation means, for providing a first modulation signal, and to said detection means, for detecting a second modulation signal;

wherein each of said plurality of transmission-reception stations transmits information along said at least one optical fiber and each of said transmission-reception stations detects information in the form of at lest one modulation signal which has been transmitted by another one of said transmission-reception stations and propagated by said at least one optical fiber;

wherein said transmission means comprises a first laser and a second laser which are respectively placed at first and second ends of said at least one optical fiber, said first and second lasers feeding into said at least one optical fiber, respectively, first and second continuous optical signals, wherein the first and second lasers transmit at different wavelengths and wherein each of said first and second laser is provided with a filter preventing it from receiving light transmitted from the other laser characterized in that each of said transmission-reception stations comprises:

first and second travelling wave semiconductor optical amplifiers which are connected in parallel on said at least one optical fiber;

each of the first and second travelling wave semiconductor optical amplifiers are for alternately modulating the continuous optical signal transmitted by one of the first and second lasers and for detecting information resulting from the modulation of the continuous optical signal of said one of the first and second lasers, modulated by another one of said transmission-reception stations; and each of the first and second amplifiers is provided with a station filter preventing each of the first and second amplifiers from receiving the light from one of the first and second lasers.

13. An optical communication system, comprising:

at least one optical fiber;

a plurality of transmission-reception stations placed along said at least one optical fiber, each of said plurality of transmission-reception stations comprising
  (a) a travelling wave semiconductor optical amplifier installed on said at least one optical fiber,
  (b) modulation means for modulating a carrier signal, and
  (c) detection means for detecting a modulation signal;

transmission means, coupled to said at least one optical fiber, for feeding into said at least one optical fiber, at least one continuous optical signal which thus traverses said optical amplifier of each of said transmission-reception stations;

wherein said optical fiber is connected to said modulation means, for providing a first modulation signal, and to said detection means, for detecting a second modulation signal;

wherein each of said transmission-reception stations transmits information along said at least one optical fiber and each of said transmission-reception stations detects information in the form of at least one modulation signal which has been transmitted by another one of said transmission-reception stations and propagated by said at least one optical fiber;

wherein said travelling wave semiconductor optical amplifier comprises a first electrode and said first electrode connects said travelling wave semiconductor optical to said modulation means;

wherein said travelling wave semiconductor optical amplifier comprises a second electrode and said second electrode connects said travelling wave semiconductor optical amplifier to said detection means; and said system further comprises control means, coupled to said modulation means and said detection means, for controlling said modulation means.

* * * * *